(12) United States Patent
Tung

(10) Patent No.: US 9,398,130 B2
(45) Date of Patent: Jul. 19, 2016

(54) MOBILE TERMINAL AND METHOD FOR CONTROLLING ANSWER MODE OF THE MOBILE TERMINAL AND NON-TRANSITORY COMPUTER-READABLE STORAGE MEDIUM

(71) Applicant: HTC Corporation, Taoyuan County (TW)

(72) Inventor: Pei-Jun Tung, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 0 days.

(21) Appl. No.: 14/460,367

(22) Filed: Aug. 15, 2014

(65) Prior Publication Data
US 2016/0050304 A1    Feb. 18, 2016

(51) Int. Cl.
H04M 1/00    (2006.01)
H04M 1/60    (2006.01)
H04M 1/725   (2006.01)
H04W 88/02   (2009.01)

(52) U.S. Cl.
CPC .......... *H04M 1/605* (2013.01); *H04M 1/72597* (2013.01); *H04M 1/6033* (2013.01); *H04M 1/6041* (2013.01); *H04M 2203/2094* (2013.01); *H04M 2250/12* (2013.01); *H04W 88/02* (2013.01)

(58) Field of Classification Search
CPC ............ H04M 1/6075; H04M 1/6041; H04M 1/6083; H04M 2250/02; H04M 1/605; H04M 1/72519; H04W 84/18; H04W 88/02
USPC ................. 455/569.1, 569.2, 570, 41.2, 41.3, 455/414.1, 418, 567, 575.9
See application file for complete search history.

(56) References Cited

U.S. PATENT DOCUMENTS

| | | | | |
|---|---|---|---|---|
| 5,224,151 A * | 6/1993 | Bowen | ............... | H04M 1/6016 340/524 |
| 5,818,924 A * | 10/1998 | King | ............... | H04M 1/0202 379/433.04 |
| 5,828,965 A * | 10/1998 | Brown | ............... | H04M 1/605 379/433.06 |
| 6,411,828 B1 * | 6/2002 | Lands | ............... | H04M 1/605 379/388.01 |
| 6,704,585 B1 * | 3/2004 | Hiebel | ............... | H04M 1/0216 455/569.1 |
| 2014/0126729 A1 * | 5/2014 | Heiman | ............... | H04R 1/00 381/58 |

* cited by examiner

*Primary Examiner* — Olumide T Ajibade Akonai
(74) *Attorney, Agent, or Firm* — Winston Hsu; Scott Margo

(57) ABSTRACT

The present disclosure relates to a method for controlling answer modes of a mobile terminal, a mobile terminal and a storage medium. The method includes: a hand free mode is enabled; it is determined through the motion sensor whether or not the mobile terminal is picked up in case where the hand free mode has been enabled and a receiver mode is not enabled; the receiver mode is enabled and the hand free mode is kept being enabled based on a determination that the mobile terminal is picked up; it is determined through the proximity sensor whether or not the mobile terminal is covered in case where both of the receiver mode and the hand free mode are enabled; and the hand free mode is disabled and the receiver mode is kept being enabled based on a determination that the mobile terminal is covered.

15 Claims, 12 Drawing Sheets

MOBILE TERMINAL AND METHOD FOR
CONTROLLING ANSWER MODE OF THE
MOBILE TERMINAL AND
NON-TRANSITORY COMPUTER-READABLE
STORAGE MEDIUM

TECHNICAL FIELD

The present disclosure generally relates to the field of communication, and particularly to a method for controlling answer modes of a mobile terminal, a mobile terminal related to the same and a storage medium.

BACKGROUND

It is desired for a user to switch answer modes of a mobile terminal when using the mobile terminal, for example, the answer mode is switched from a hand free mode to a receiver mode. Currently, a proximity sensor may be utilized to detect whether an object is close to the mobile terminal; if it is detected that the object is close to the mobile terminal, the hand free mode is disabled and the receiver mode is enabled, so as to switch the hand free mode to the receiver mode.

SUMMARY

According to some embodiments, a method for controlling answer modes of a mobile terminal is disclosed, wherein, the mobile terminal includes a motion sensor and a proximity sensor, the method may include: a hand free mode is enabled; it is determined through the motion sensor whether or not the mobile terminal is picked up in case where the hand free mode has been enabled and a receiver mode is not enabled; the receiver mode is enabled and the hand free mode is kept being enabled based on a determination that the mobile terminal is picked up; it is determined through the proximity sensor whether or not the mobile terminal is covered in case where both of the receiver mode and the hand free mode are enabled; and the hand free mode is disabled and the receiver mode is kept being enabled based on a determination that the mobile terminal is covered.

According to some embodiments, a mobile terminal is disclosed. The mobile terminal may include: a motion sensor; a proximity sensor; a memory configured to store instructions; a processor configured to execute the instructions to cause the mobile terminal to perform: enabling a hand free mode; determining through the motion sensor whether or not the mobile terminal is picked up in case where the hand free mode has been enabled and a receiver mode is not enabled; enabling the receiver mode and keeping the hand free mode being enabled based on a determination that the mobile terminal is picked up; determining through the proximity sensor whether or not the mobile terminal is covered in case where both of the receiver mode and the hand free mode are enabled; and disabling the hand free mode and keeping the receiver mode being enabled based on a determination that the mobile terminal is covered.

According to some embodiments, a non-volatile computer readable storage medium is disclosed. The computer readable storage medium storing programs for controlling answer modes of a mobile terminal thereon, wherein, the mobile terminal includes a motion sensor and a proximity sensor; wherein, the programs are executed to cause the mobile terminal to perform: enabling a hand free mode; determining through the motion sensor whether or not the mobile terminal is picked up in case where the hand free mode has been enabled and a receiver mode is not enabled; enabling the receiver mode and keeping the hand free mode being enabled based on a determination that the mobile terminal is picked up; determining through the proximity sensor whether or not the mobile terminal is covered in case where both of the receiver mode and the hand free mode are enabled; and disabling the hand free mode and keeping the receiver mode being enabled based on a determination that the mobile terminal is covered.

According to some embodiments, a mobile terminal is disclosed. The mobile terminal may include: a motion sensor module; a proximity sensor module; and a processor module configured to determine whether or not the mobile terminal is picked up through the motion sensor module in case where the hand free mode has been enabled and a receiver mode is not enabled. The processor module is also configured to enable the receiver mode and to keep the hand free mode being enabled based on a determination that the mobile terminal is picked up. The processor module is also configured to determine whether or not the mobile terminal is covered through the proximity sensor module in case where both of the receiver mode and the hand free mode are enabled. The processor module is also configured to disable the hand free mode and to keep the receiver mode being enabled based on a determination that the mobile terminal is covered.

Alternatively, the processor module may be configured to determine whether the mobile terminal is not covered through the proximity sensor module in case where the hand free mode has been enabled and a receiver mode is not enabled. The processor module is also configured to enable the receiver mode and to keep the hand free mode being enabled based on a determination that the mobile terminal is not covered.

Alternatively, the processor module may be configured to adjust volume of a speaker used in the hand free mode through the motion sensor module in case where both of the receiver mode and the hand free mode are enabled.

Alternatively, the processor module may be configured to adjust power and/or noise reduction of a microphone used in the receiver mode through the motion sensor module in case where both of the receiver mode and the hand free mode are enabled.

Alternatively, the motion sensor may include at least one of a gyroscope, an accelerometer or an altimeter.

DETAILED DESCRIPTION

Embodiments of the present application will be described in detail hereinafter. It should be noted that the embodiments described herein intend for illustration, and the scope of the present disclosure is not limited thereto.

Figure 1:
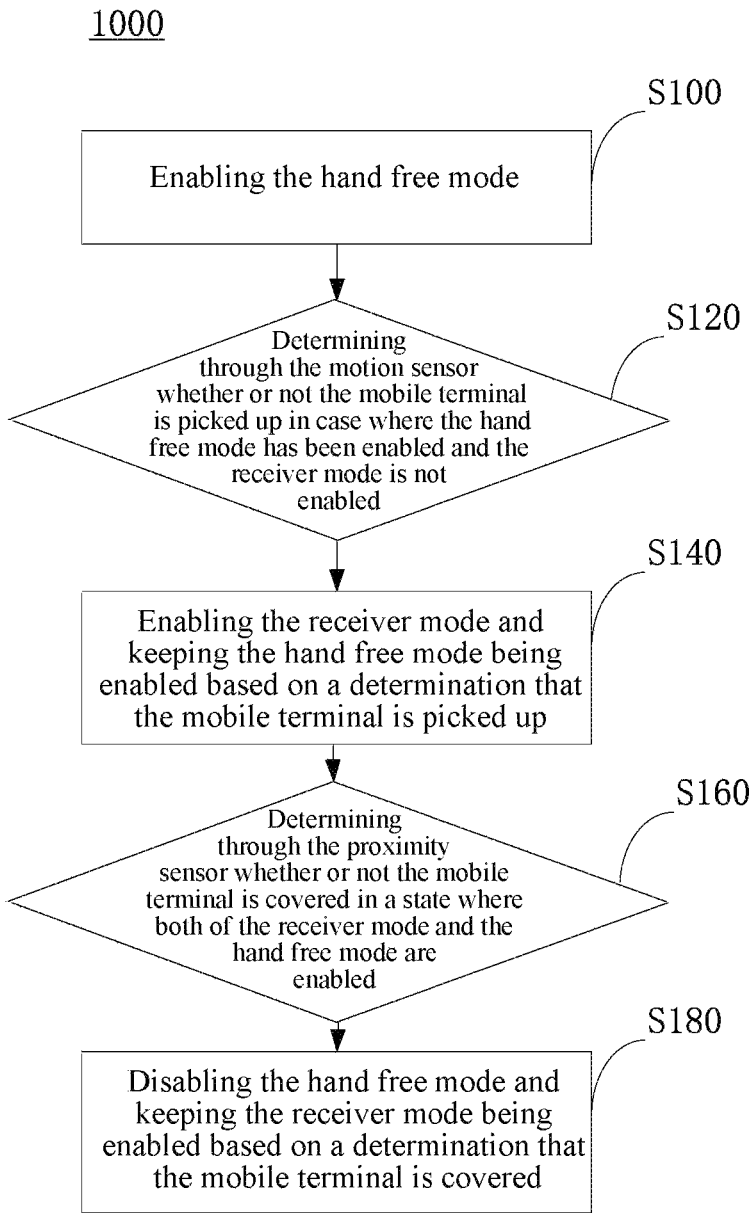
FIG. 1 is a flow chart showing a method 1000 for controlling answer modes of a mobile terminal according to embodiments of the present disclosure.

FIG. 1 is a flow chart showing a method 1000 for controlling answer modes of a mobile terminal according to embodiments of the present disclosure. The mobile terminal may include a proximity sensor and a motion sensor. The motion sensor includes at least one of a gyroscope, an accelerometer or an altimeter, for example.

In some embodiments of the present disclosure, the mobile terminal includes at least two speakers, so that one of the two speakers may be used in a hand free mode and another may be used in a receiver mode.

As shown in FIG. 1, in step S100, the hand free mode of the mobile terminal is enabled. For example, audio signals are output from the mobile terminal through the speaker used in the hand free mode.

In step S120, in case where the hand free mode has been enabled and the receiver mode is not enabled, it is determined through the motion sensor whether or not the mobile terminal is picked up.

For example, the motion sensor includes at least one of a gyroscope, an accelerometer or an altimeter. For example, in a state where the hand free mode has been enabled and the receiver mode is not enabled, that is, audio signals are output from the mobile terminal through the speaker used in the hand free mode, it is determined whether or not the mobile terminal is picked up by an angular velocity signal of the mobile terminal received from the gyroscope, and/or by an acceleration signal of the mobile terminal received from the accelerometer, and/or by a height signal of the mobile terminal received from the altimeter. Specific implementations for determining whether or not the mobile terminal is picked up are not limited herein. In some embodiments, specific implementations for determining whether or not the mobile terminal is picked up may be referred to manners described in EP1748631, the entire contents of which are incorporated herein by reference.

If it is determined that the mobile terminal is picked up in step S120, the receiver mode is enabled while the hand free mode is kept being enabled in step S140 based on this determination that the mobile terminal is picked up.

In some embodiments, for example, it is determined that the mobile terminal is picked up in step S120 through the motion sensor such as the gyroscope, the accelerometer and/or the altimeter, the receiver mode is enabled and the hand free mode is kept being enabled based on this determination in step S140. In other words, the receiver mode is enabled so that both of the receiver mode and the hand free mode are in the enabled state. That is, audio signals are simultaneously output from the mobile terminal through the speaker used in the receiver mode and the speaker used in the hand free mode, which is different from the manner in the related art that only one of the hand free mode and the receiver mode is enabled.

In some embodiments, determination conditions for enabling the receiver mode and keeping the hand free mode being enabled in step S140 are not limited thereto. That is, it may be determined to enable the receiver mode and to keep the hand free mode being enabled based on a combination of other appropriate determination(s) and the determination that the mobile terminal is picked up.

In step S160, in a state where both of the receiver mode and the hand free mode are enabled, it is determined through the proximity sensor whether the mobile terminal is covered or not.

In some embodiments, for example, in a state where both of the receiver mode and the hand free mode are enabled, it is determined through the proximity sensor whether or not the mobile terminal is covered, for example by a face of a user. In some embodiments, for example, a distance between the mobile terminal and the face of the user is determined through the proximity sensor. For example, if the distance is greater than a predetermined distance threshold, it is determined that the mobile terminal is not covered; and if the distance equals to and/or is less than the predetermined distance threshold, it is determined that the mobile terminal is covered. Specific implementations for determining whether or not the mobile terminal is covered are not limited herein. In some embodiments, specific implementations for determining whether or not the mobile terminal is covered may be referred to the manners described in CN102801869A, the entire contents of which are incorporated herein by reference.

If it is determined that the mobile terminal is covered in step S160, the hand free mode is disabled and the receiver mode is kept being enabled in step S180 based on this determination that the mobile terminal is covered.

In some embodiments, determination conditions for disabling the hand free mode and keeping the receiver mode being enabled in step S180 are not limited thereto. That is, it may be determined to disable the hand free mode and to keep the receiver mode being enabled based on a combination of other appropriate determination(s) and the determination that the mobile terminal is covered.

In some embodiments, for example, in case where it is determined that the mobile terminal is covered, it is considered as that the distance between the mobile terminal and the face of the user is small enough, and at this time voice signals from the mobile terminal may be clearly heard by the user through the receiver mode. Therefore, the hand free mode is disabled but the receiver mode is kept being enabled. That is, audio signals are output from the mobile terminal only through the speaker used in the receiver mode.

In the related art, since only one of the hand free mode and the receiver mode of the mobile terminal is enabled, the output voice tends to be intermittent and even some information may be missed by the user when the hand free mode is switched to/from the receiver mode. For example, the intermittence caused by the switch between the modes may make "do not" sound like "do". Through the above embodiments, in the process that the mobile terminal is picked up, the receiver mode is enabled and the hand free mode is kept being enabled, such that both of the modes of the mobile terminal are enabled. During the process that the mobile terminal is picked up, audio signals are simultaneously output from the speakers respectively used in the two modes; and the hand free mode is enabled until the mobile terminal is covered (which may be understood as the mobile terminal is close enough to an ear of the user). Therefore, during the whole process from the mobile terminal is picked up to the mobile terminal becomes close to the ear of the user, the intermittence is prevented from occurring, so that the user may clearly hear the voice from the mobile terminal during the whole process. Thus, the technical problem in the related art may be overcome.

Figure 2:
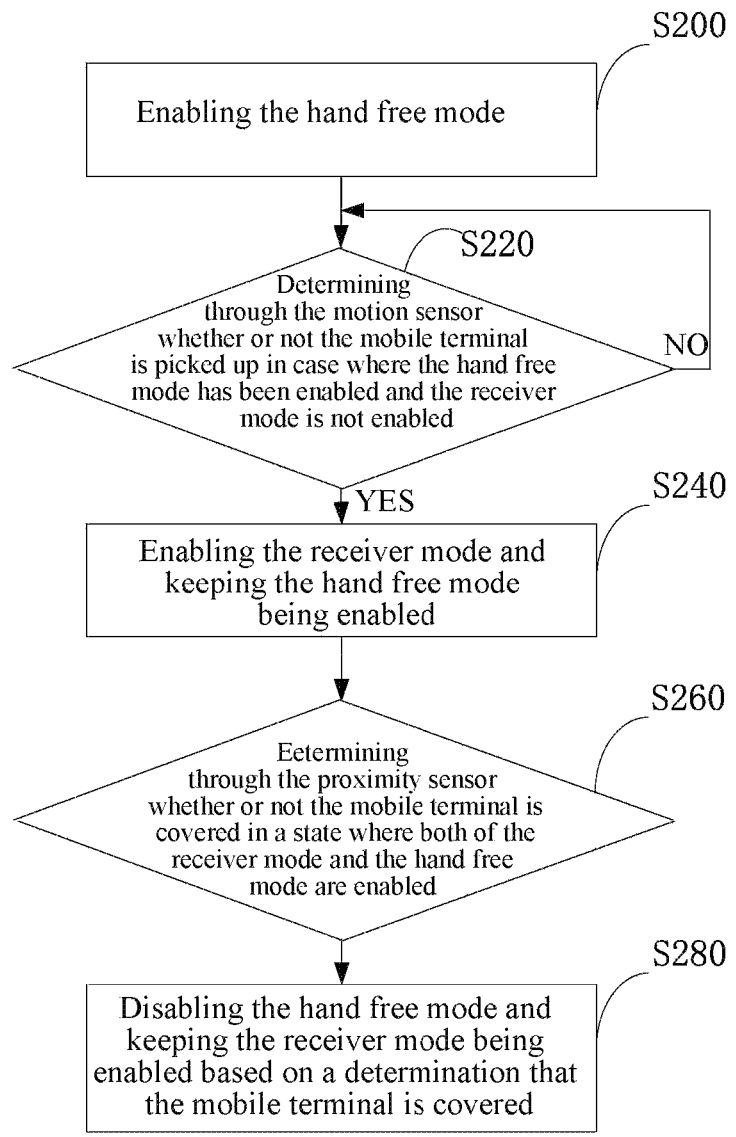
FIG. 2 is a flow chart showing a method 2000 for controlling answer modes of a mobile terminal according to embodiments of the present disclosure.

FIG. 2 is a flow chart showing a method 2000 for controlling answer modes of a mobile terminal according to embodiments of the present disclosure. As shown in FIG. 2, steps S200, S260 and S280 are respectively the same with the steps S100, S160 and S180 in the method 1000, the description of which will not be repeated herein.

In step S220, in case where the hand free mode has been enabled and the receiver mode is not enabled, it is determined through the motion sensor whether or not the mobile terminal is picked up.

If it is determined that the mobile terminal is picked up in case where the hand free mode has been enabled and the receiver mode is not enabled, the process proceeds to step S240, in which the receiver mode is enabled and the hand free mode is kept being enabled.

If it is determined that the mobile terminal is not picked up in case where the hand free mode has been enabled and the receiver mode is not enabled, step S220 is continued to be performed, that is, it is continued to determine through the motion sensor whether or not the mobile terminal is picked up.

Figure 3:
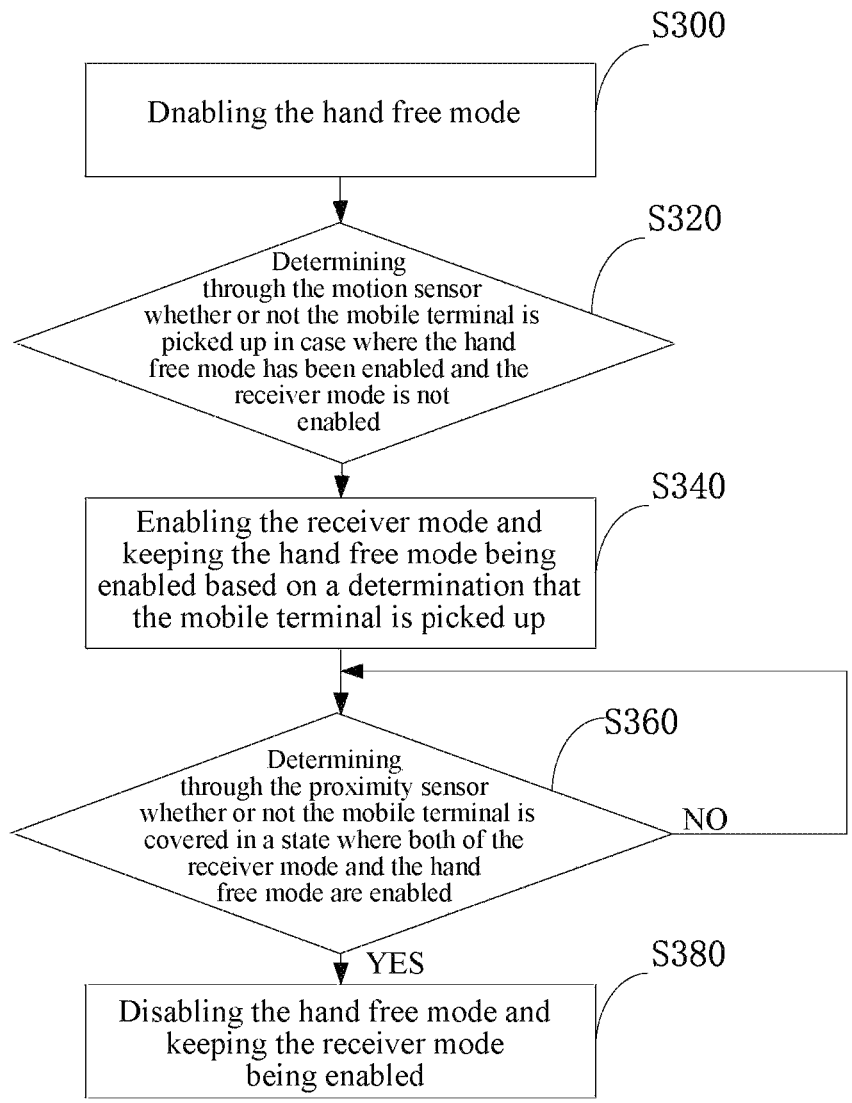
FIG. 3 is a flow chart showing a method 3000 for controlling answer modes of a mobile terminal according to embodiments of the present disclosure.

FIG. 3 is a flow chart showing a method 3000 for controlling answer modes of a mobile terminal according to embodiments of the present disclosure. As shown in FIG. 3, steps S300, S320 and S340 are respectively the same with the steps S100, S120 and S140 in the method 1000, the description of which will not be repeated herein.

In step S360, in a state where both of the receiver mode and the hand free mode are enabled, it is determined through the proximity sensor whether or not the mobile terminal is covered.

If it is determined that the mobile terminal is covered in a state where both of the receiver mode and the hand free mode are enabled, the process proceeds to step S380, in which the hand free mode is disabled and the hand set mode is kept being enabled.

If it is determined that the mobile terminal is not covered in a state where both of the receiver mode and the hand free mode are enabled, step S360 is continued to be performed, that is, it is continued to determine through the proximity sensor whether or not the mobile terminal is covered.

Figure 4:
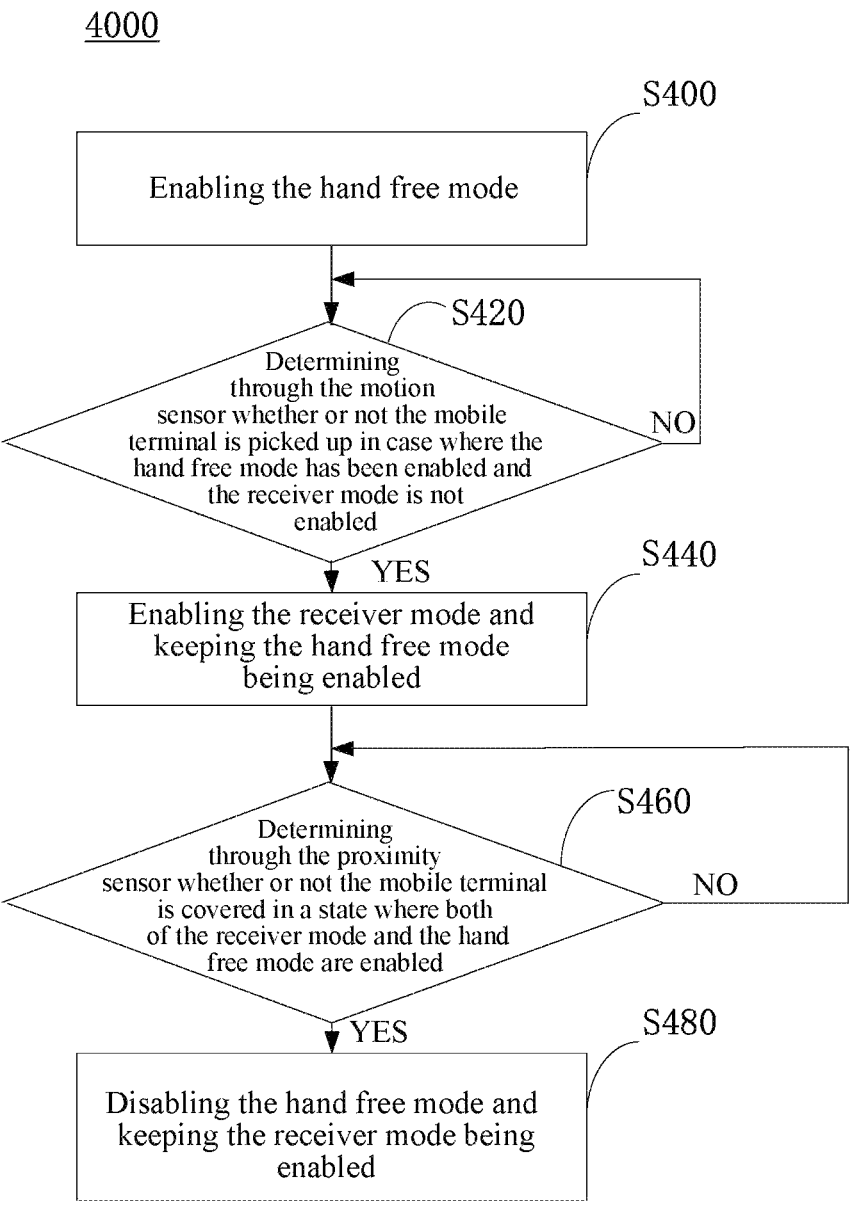
FIG. 4 is a flow chart showing a method 4000 for controlling answer modes of a mobile terminal according to embodiments of the present disclosure.

FIG. 4 is a flow chart showing a method 4000 for controlling answer modes of a mobile terminal according to embodiments of the present disclosure.

As shown in FIG. 4, in step S400, the hand free mode of the mobile terminal is enabled. For example, audio signals are output from the mobile terminal through the speaker used in the hand free mode.

In step S420, in case where the hand free mode has been enabled and the receiver mode is not enabled, it is determined through the motion sensor whether or not the mobile terminal is picked up. If it is determined that the mobile terminal is not picked up, step S420 is continued to be performed, that is, it is continued to determine through the motion sensor whether or not the mobile terminal is picked up. If it is determined that the mobile terminal is picked up, the process proceeds to step S440, in which the receiver mode is enabled and the hand free mode is kept being enabled.

In step S460, in a state where both of the receiver mode and the hand free mode are enabled, it is determined through the proximity sensor whether or not the mobile terminal is covered. If it is determined that the mobile terminal is not covered, step S460 is continued to be performed, that is, it is continued to determine through the proximity sensor whether the mobile terminal is covered. If it is determined that the mobile terminal is covered, the process proceeds to step S480, in which the hand free mode is disabled and the receiver mode is kept being enabled FIG. 5 is a flow chart showing a method 5000 for controlling answer modes of a mobile terminal according to embodiments of the present disclosure.

Figure 5:
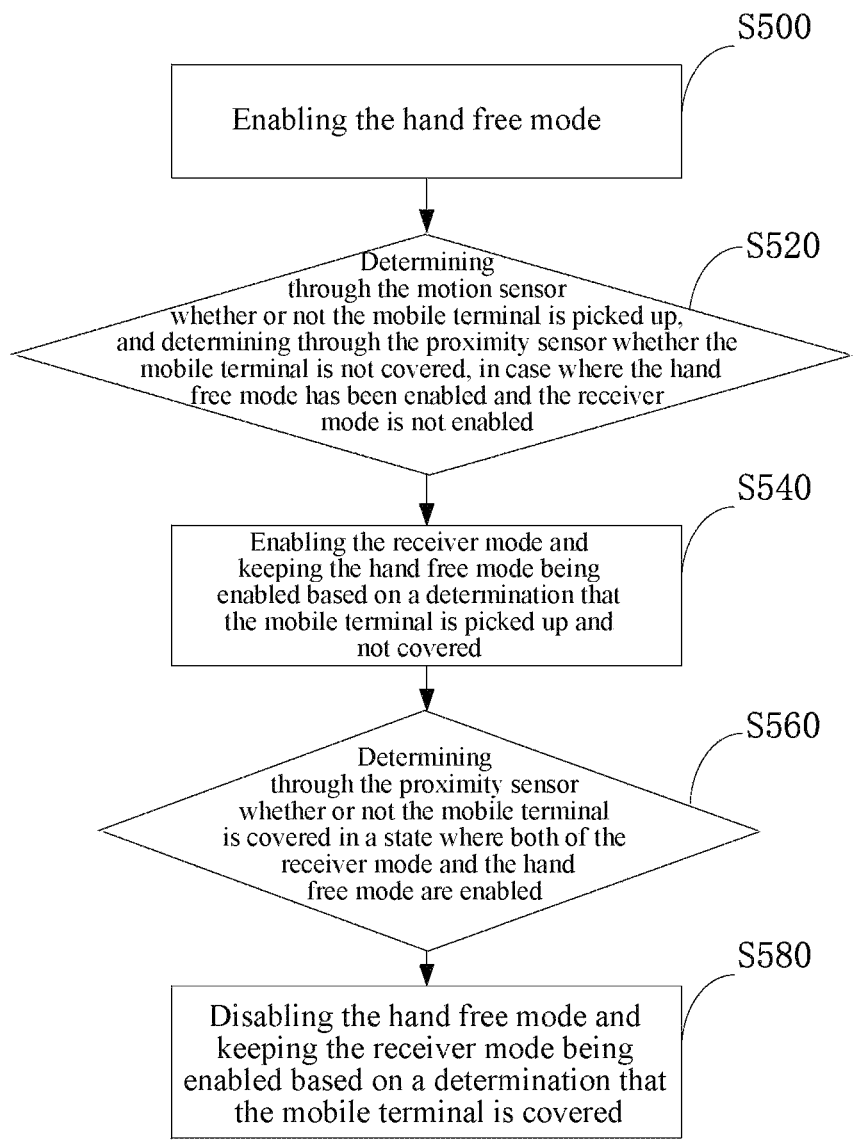
FIG. 5 is a flow chart showing a method 5000 for controlling answer modes of a mobile terminal according to embodiments of the present disclosure.

As shown in FIG. 5, in step S500, the hand free mode of the mobile terminal is enabled. For example, audio signals are output from the mobile terminal through the speaker used in the hand free mode.

In step S520, in case where the hand free mode has been enabled and the receiver mode is not enabled, it is determined through the motion sensor whether or not the mobile terminal is picked up, and it is determined through the proximity sensor whether the mobile terminal is not covered. For example, in case where the hand free mode has been enabled and the receiver mode is not enabled, it is determined whether or not the mobile terminal is picked up through at least one of the gyroscope, the accelerometer and the altimeter, and it is determined through the proximity sensor whether the mobile terminal is not covered (which may be understood as whether the mobile terminal is close to an ear of the user).

In step S540, based on a determination that the mobile terminal is picked up and not covered, the receiver mode is enabled and the hand free mode is kept being enabled. For example, it is determined through the motion sensor that the mobile terminal is picked up and it is determined through the proximity sensor that the mobile terminal is not covered (which may be understood as that the mobile terminal is picked up and not close to the ear of the user), the receiver mode is enabled and the hand free mode is kept being enabled.

In some embodiments, determination conditions for enabling the receiver mode and keeping the hand free mode being enabled in step S540 are not limited thereto. That is, it may be determined to enable the receiver mode and to keep the hand free mode being enabled based on a combination of other appropriate determination(s) and the determination that the mobile terminal is picked up and not covered.

In step S560, in a state where both of the receiver mode and the hand free mode are enabled, it is determined through the proximity sensor whether or not the mobile terminal is covered.

If it is determined that the mobile terminal is covered in step S560, based on this determination that the mobile terminal is covered, the hand free mode is disabled and the receiver mode is kept being enabled in step S580.

In some embodiments, determination conditions for disabling the hand free mode and keeping the receiver mode being enabled in step S580 are not limited thereto. That is, it may be determined to disable the hand free mode and to keep the receiver mode being enabled based on a combination of other appropriate determination(s) and the determination that the mobile terminal is covered.

Figure 6:
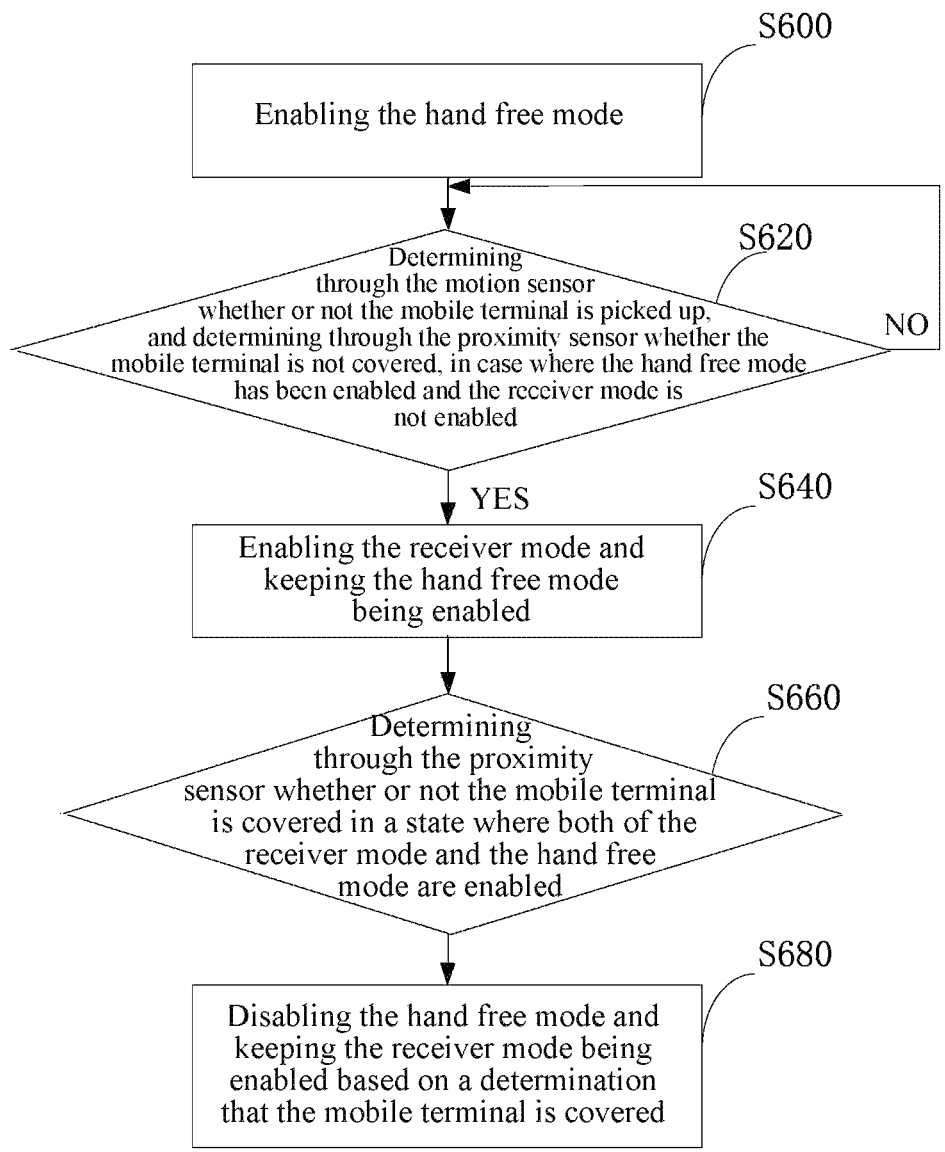
FIG. 6 is a flow chart showing a method 6000 for controlling answer modes of a mobile terminal according to embodiments of the present disclosure.

FIG. 6 is a flow chart showing a method 6000 for controlling answer modes of a mobile terminal according to embodiments of the present disclosure. As shown in FIG. 6, steps S600, S660 and S680 are respectively the same with the steps S500, S560 and S580 in the method 5000, the description of which will not be repeated herein.

In step S620, in case where the hand free mode has been enabled and the receiver mode is not enabled, it is determined through the motion sensor whether or not the mobile terminal is picked up, and it is determined through the proximity sensor whether the mobile terminal is not covered.

If it is determined that the mobile terminal is picked up and not covered (which may be understood as that the mobile terminal is picked up and not close to an ear of the user) in case where the hand free mode has been enabled and the receiver mode is not enabled, the process proceeds to step S640, in which the receiver mode is enabled and the hand free mode is kept being enabled.

If it is determined that the mobile terminal is not picked up, or the mobile terminal is picked up and is covered (which may be understood as the mobile terminal is close to the ear of the user) in case where the hand free mode has been enabled and the receiver mode is not enabled, step S620 is continued to be performed.

Alternatively, in other embodiments, after steps S500, S520 and S540, or after steps S600, S620 and S640, the above steps S360 and S380 may be performed, the detailed description of which may be referred to the embodiments discussed previously.

Alternatively, in other embodiments, after steps S500, S520 and S540, or after steps S600, S620 and S640, the above steps S460 and S480 may be performed, the detailed description of which may be referred to the embodiments discussed previously.

Figure 7:
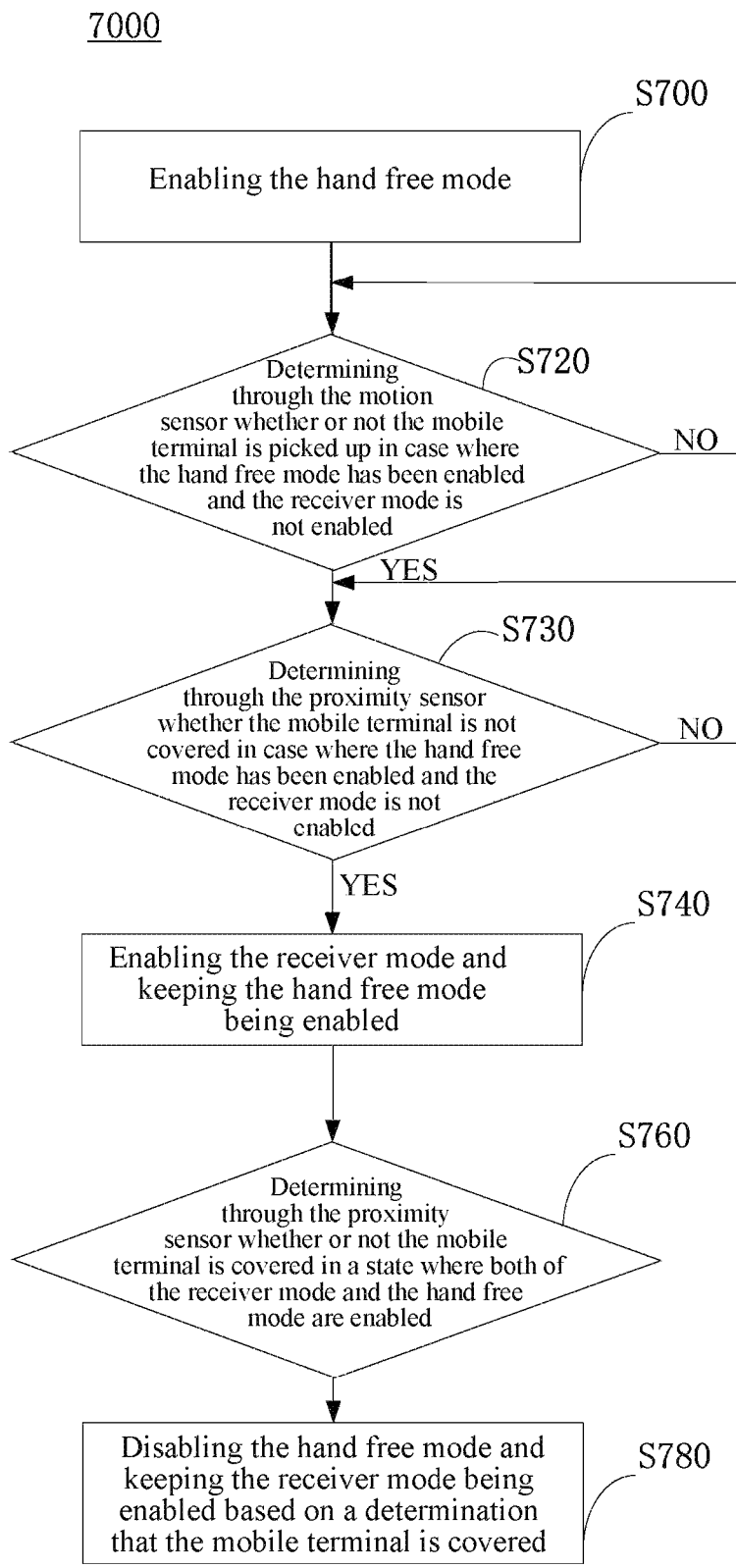
FIG. 7 is a flow chart showing a method 7000 for controlling answer modes of a mobile terminal according to embodiments of the present disclosure.

FIG. 7 is a flow chart showing a method 7000 for controlling answer modes of a mobile terminal according to embodiments of the present disclosure.

As shown in FIG. 7, in step S700, the hand free mode of the mobile terminal is enabled. For example, audio signals are output from the mobile terminal through the speaker used in the hand free mode.

In step S720, in case where the hand free mode has been enabled and the receiver mode is not enabled, it is determined through the motion sensor whether or not the mobile terminal is picked up. If it is determined that the mobile terminal is not picked up, step S720 is continued to be performed, that is, it is continued to determine through the motion sensor whether or not the mobile terminal is picked up. If it is determined that the mobile terminal is picked up, the process proceeds to step S730.

In step S730, in case where the hand free mode has been enabled and the receiver mode is not enabled, it is determined through the proximity sensor whether the mobile terminal is not covered. If it is determined that the mobile terminal is covered, step S730 is continued to be performed. If it is determined that the mobile terminal is not covered, which may be understood as that the mobile terminal is picked up and not close to an ear of the user at that time, and the process proceeds to step S740, in which the receiver mode is enabled and the hand free mode is kept being enabled.

In step S760, in a state where both of the receiver mode and the hand free mode are enabled, it is determined through the proximity sensor whether or not the mobile terminal is covered.

If it is determined that the mobile terminal is covered in step S760, the hand free mode is disabled and the receiver mode is kept being enabled in step S780 based on this determination that the mobile terminal is covered.

In some embodiments, determination conditions for disabling the hand free mode and keeping the receiver mode being enabled in step S780 are not limited thereto. That is, it may be determined to disable the hand free mode and to keep the receiver mode being enabled based on a combination of other appropriate determination(s) and the determination that the mobile terminal is covered.

Figure 8:
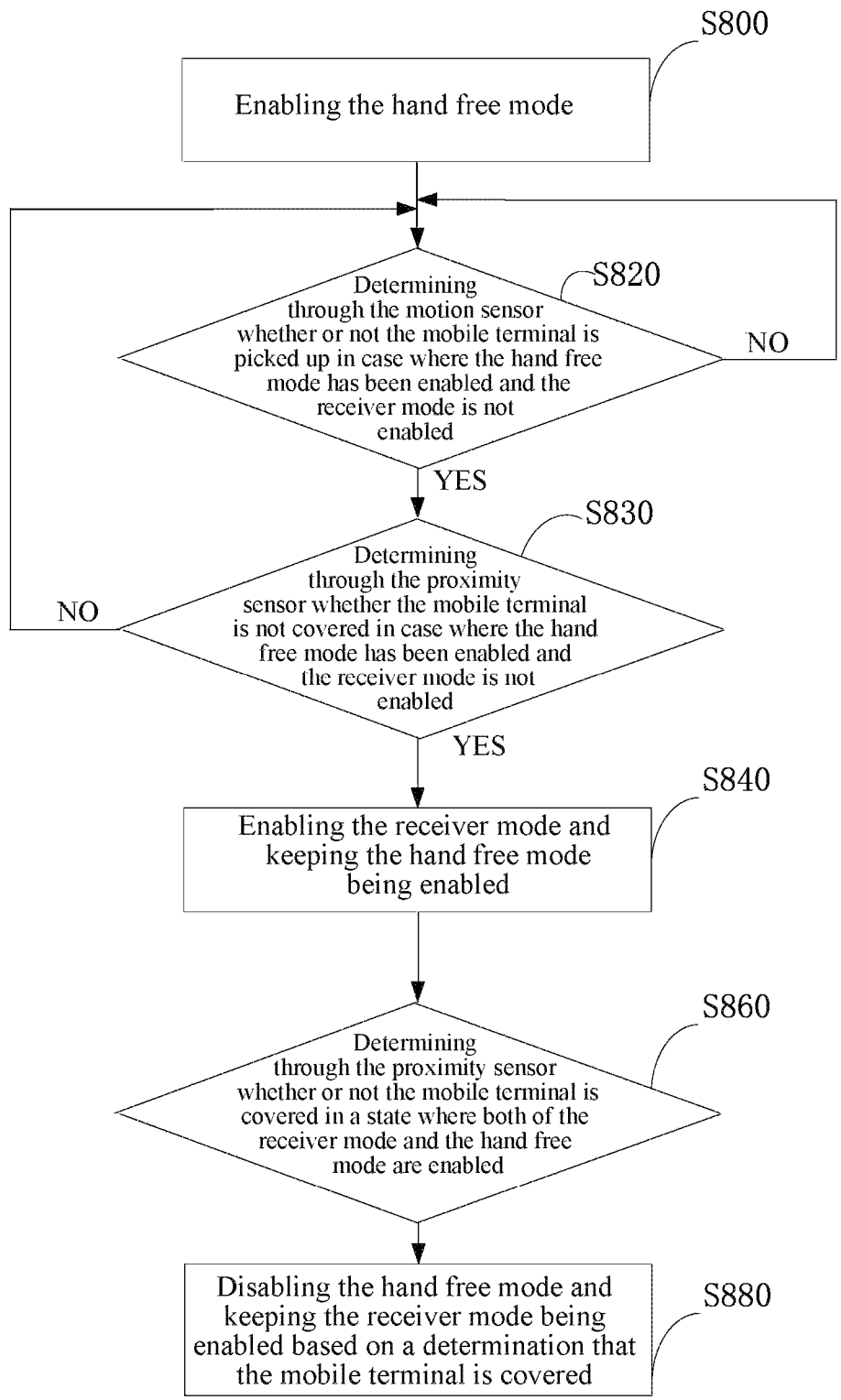
FIG. 8 is a flow chart showing a method 8000 for controlling answer modes of a mobile terminal according to embodiments of the present disclosure.

FIG. 8 is a flow chart showing a method 8000 for controlling answer modes of a mobile terminal according to embodiments of the present disclosure. Steps S800, S820 and S840-S880 in FIG. 8 are respectively the same with the steps S700, S720 and S740-S780 in the method 7000, the description of which will not be repeated herein.

In step S830, in case where the hand free mode has been enabled and the receiver mode is not enabled, it is determined through the proximity sensor whether the mobile terminal is not covered. If it is determined that the mobile terminal is covered, the process returns to step S820, i.e., to determine again through the motion sensor whether or not the mobile terminal is picked up. If it is determined that the mobile terminal is not covered, which may be understood as that the mobile terminal is picked up and not close to an ear of the user at that time, and then the process proceeds to step S840, in which the receiver mode is enabled and the hand free mode is kept being enabled.

Alternatively, in other embodiments, after steps S700, S720, S730 and S740, or after steps S800, S820, S830 and S840, the above steps S360 and S380 may be performed, the detailed description of which may be referred to the embodiments discussed previously.

Alternatively, in other embodiments, after steps S700, S720, S730 and S740, or after steps S800, S820, S830 and S840, the above steps S460 and S480 may be performed, the detailed description of which may be referred to the embodiments discussed previously.

Figure 9:
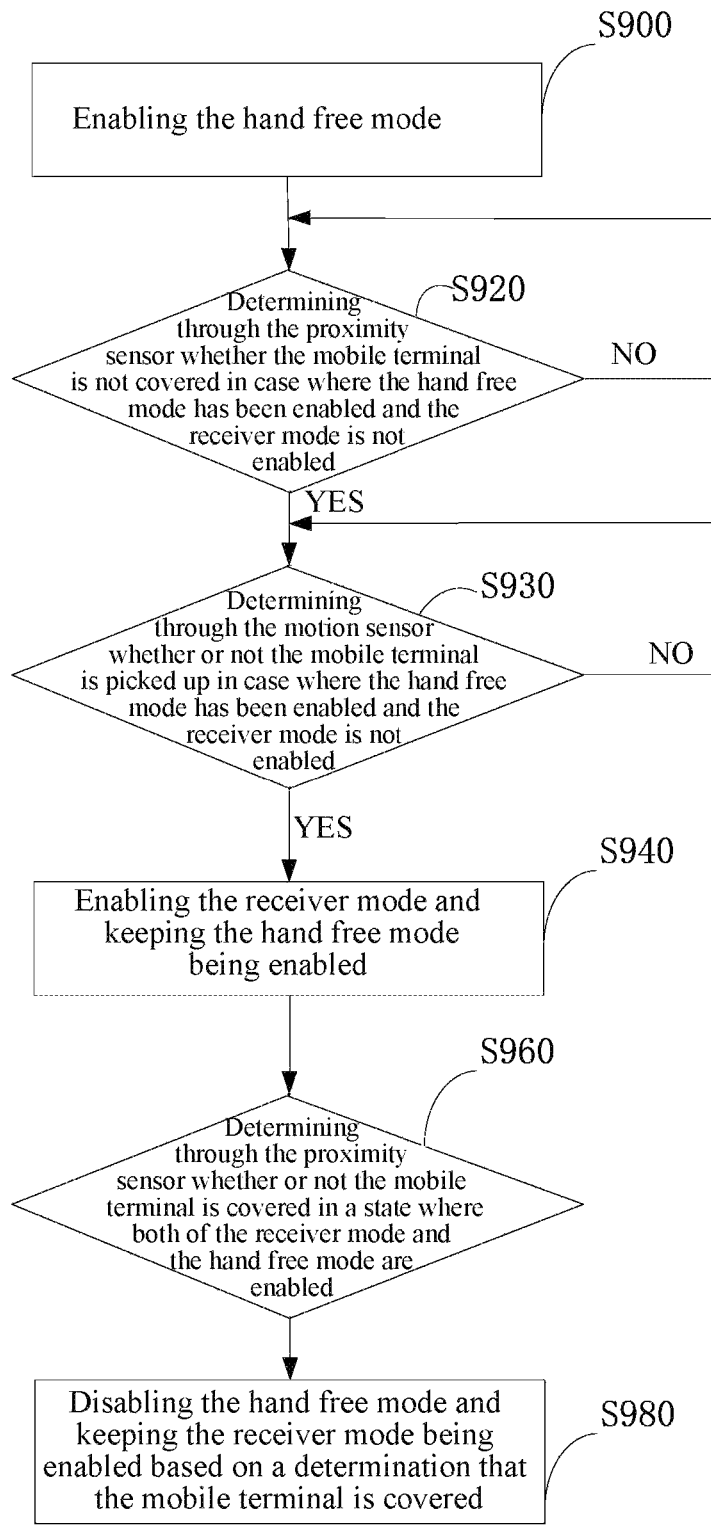
FIG. 9 is a flow chart showing a method 9000 for controlling answer modes of a mobile terminal according to embodiments of the present disclosure.

FIG. 9 is a flow chart showing a method 9000 for controlling answer modes of a mobile terminal according to embodiments of the present disclosure.

As shown in FIG. 9, in step S900, the hand free mode of the mobile terminal is enabled. For example, audio signals are output from the mobile terminal through the speaker used in the hand free mode.

In step S920, in case where the hand free mode has been enabled and the receiver mode is not enabled, it is determined through the proximity sensor whether the mobile terminal is not covered. If it is determined that the mobile terminal is covered (which may be understood as that mobile terminal is close to an ear of the user at that time), the step S920 is continued to be performed. If it is determined that the mobile terminal is not covered, which may be understood as that the mobile terminal is not close to the ear of the user, and then the process proceeds to step S930.

In step S930, in case where the hand free mode has been enabled and the receiver mode is not enabled, it is determined through the motion sensor whether or not the mobile terminal is picked up. If it is determined that the mobile terminal is not picked up, step S930 is continued to be performed, that is, it is continued to determine through the motion sensor whether or not the mobile terminal is picked up. If it is determined that the mobile terminal is picked up, the process proceeds to step S940, in which the receiver mode is enabled and the hand free mode is kept being be enabled.

In step S960, in a state where both of the receiver mode and the hand free mode are enabled, it is determined through the proximity sensor whether or not the mobile terminal is covered.

If it is determined that the mobile terminal is covered in step S960, the hand free mode is disabled and the receiver mode is kept being enabled in step S980 based on this determination that the mobile terminal is covered.

In some embodiments, determination conditions for disabling the hand free mode and keeping the receiver mode being enabled in step S980 are not limited thereto. That is, it may be determined to disable the hand free mode and to keep the receiver mode being enabled based on a combination of other appropriate determination(s) and the determination that the mobile terminal is covered.

Figure 10:
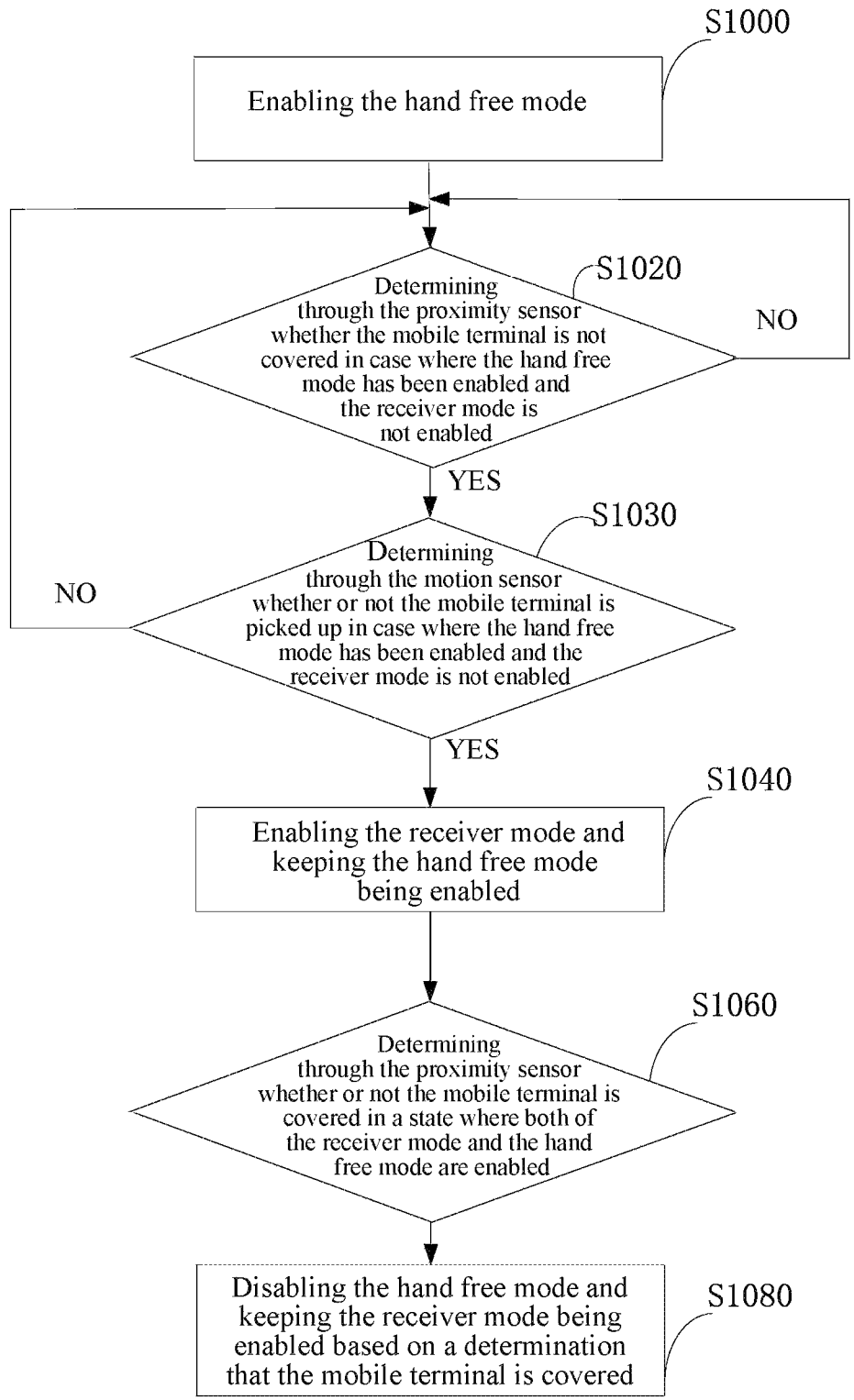
FIG. 10 is a flow chart showing a method 10000 for controlling answer modes of a mobile terminal according to embodiments of the present disclosure.

FIG. 10 is a flow chart showing a method 10000 for controlling answer modes of a mobile terminal according to embodiments of the present disclosure. Steps S1000, S1020 and S1040-S1080 in FIG. 10 are respectively the same with the steps S900, S920 and S940-S980 in the method 9000, the description of which will not be repeated herein.

In step S1030, in case where the hand free mode has been enabled and the receiver mode is not enabled, it is determined through the motion sensor whether or not the mobile terminal is picked up. If it is determined that the mobile terminal is not picked up, the process returns to step S1020 to determine again through the proximity sensor whether the mobile terminal is not covered. If it is determined that the mobile terminal is picked up, the process proceeds to step S1040, in which the receiver mode is enabled and the hand free mode is kept being enabled.

Alternatively, in other embodiments, after steps S900, S920, S930 and S940, or after steps S1000, S1020, S1030 and S1040, the above steps S360 and S380 may be performed, the detailed description of which may be referred to the embodiments discussed previously.

Alternatively, in other embodiments, after steps S900, S920, S930 and S940, or after steps S1000, S1020, S1030 and S1040, the above steps S460 and S480 may be performed, the detailed description of which may be referred to the embodiments discussed previously.

Alternatively, in case where both of the receiver mode and the hand free mode are enabled, volume of the speaker used in the hand free mode of the mobile terminal may be adjusted through the motion sensor.

For example, in case where both of the receiver mode and the hand free mode are enabled, an angular velocity of the mobile terminal may be detected by the gyroscope, then the detected angular velocity is compared with a predetermined angular velocity threshold, and the volume of the speaker used in the hand free mode is controlled according to the comparison. For example, in case where both of the receiver mode and the hand free mode are enabled, an acceleration of the mobile terminal may be detected by the accelerometer, then the detected acceleration is compared with a predetermined acceleration threshold, and the volume of the speaker used in the hand free mode is controlled according to the comparison. For example, in case where both of the receiver mode and the hand free mode are enabled, a height of the mobile terminal may be detected by the altimeter, then the detected height is compared with a predetermined height threshold, and the volume of the speaker used in the hand free mode is controlled according to the comparison. For example, in case where it is determined that the mobile terminal is getting close to the user according to the comparison, the volume of the speaker used in the hand free mode is decreased; and in case where it is determined that the mobile terminal is getting far away from the user according to the comparison, the volume of the speaker used in the hand free mode is increased. In some embodiments, for example, a method disclosed in CN102655541 may be utilized to adjust the volume of the speaker used in the hand free mode.

Alternatively, in case where both of the receiver mode and the hand free mode are enabled, a distance between the mobile terminal and a surrounding object (the face of the user, for example) may be detected by the proximity sensor, then the detected distance is compared with a predetermined distance threshold, and the volume of the speaker used in the hand free mode is controlled according to the comparison. For example, in case where it is determined that the mobile terminal is getting close to the user according to the comparison, the volume of the speaker used in the hand free mode is decreased; and in case where it is determined that the mobile terminal is getting far away from the user according to the comparison, the volume of the speaker used in the hand free mode is increased.

Alternatively, in case where both of the receiver mode and the hand free mode are enabled, power and/or noise reduction of a microphone used in the receiver mode may be adjusted through the motion sensor for the mobile terminal.

For example, in case where both of the receiver mode and the hand free mode are enabled, an angular velocity of the mobile terminal may be detected by the gyroscope, then the detected angular velocity is compared with a predetermined angular velocity threshold, and the power and/or noise reduction of the microphone used in the receiver mode are controlled according to the comparison. For example, in case where both of the receiver mode and the hand free mode are enabled, an acceleration of the mobile terminal may be detected by the accelerometer, then the detected acceleration is compared with a predetermined acceleration threshold, and the power and/or noise reduction of the microphone used in the receiver mode are controlled according to the comparison. For example, in case where both of the receiver mode and the hand free mode are enabled, a height of the mobile terminal may be detected by the altimeter, then the detected height is compared with a predetermined height threshold, and the power and/or noise reduction of the microphone used in the receiver mode are controlled according to the comparison. For example, in case where it is determined that the mobile terminal is getting close to the user according to the comparison, the power of the microphone used in the receiver mode is decreased and/or a noise reduction level of the speaker used in the hand free mode is decreased properly; and in case where it is determined that the mobile terminal is getting far away from the user according to the comparison, the power of the microphone used in the receiver mode is increased and/or a noise reduction level of the speaker used in the hand free mode is increased properly.

Alternatively, in case where both of the receiver mode and the hand free mode are enabled, a distance between the mobile terminal and a surrounding object (the face of the user, for example) may be detected by the proximity sensor, then the detected distance is compared with a predetermined distance threshold, and the power and/or noise reduction of the speaker used in the hand free mode are controlled according to the comparison. For example, in case where it is determined that the mobile terminal is getting close to the user according the comparison, the power of the microphone used in the receiver mode is decreased and/or a noise reduction level of the speaker used in the hand free mode is decreased properly; and in case where it is determined that the mobile terminal is getting far away from the user according to the comparison, the power of the microphone used in the receiver mode is increased and/or a noise reduction level of the speaker used in the hand free mode is increased properly.

Alternatively, the methods for controlling the speakers used in the hand free mode and the receiver mode described above are applicable to microphones. Alternatively, for a same mobile terminal, determination conditions for turning on and off the microphones may be the same with those for the speakers. Alternatively, for a same mobile terminal, determination conditions for turning on and off the microphones may be different from those for the speakers.

Figure 11:
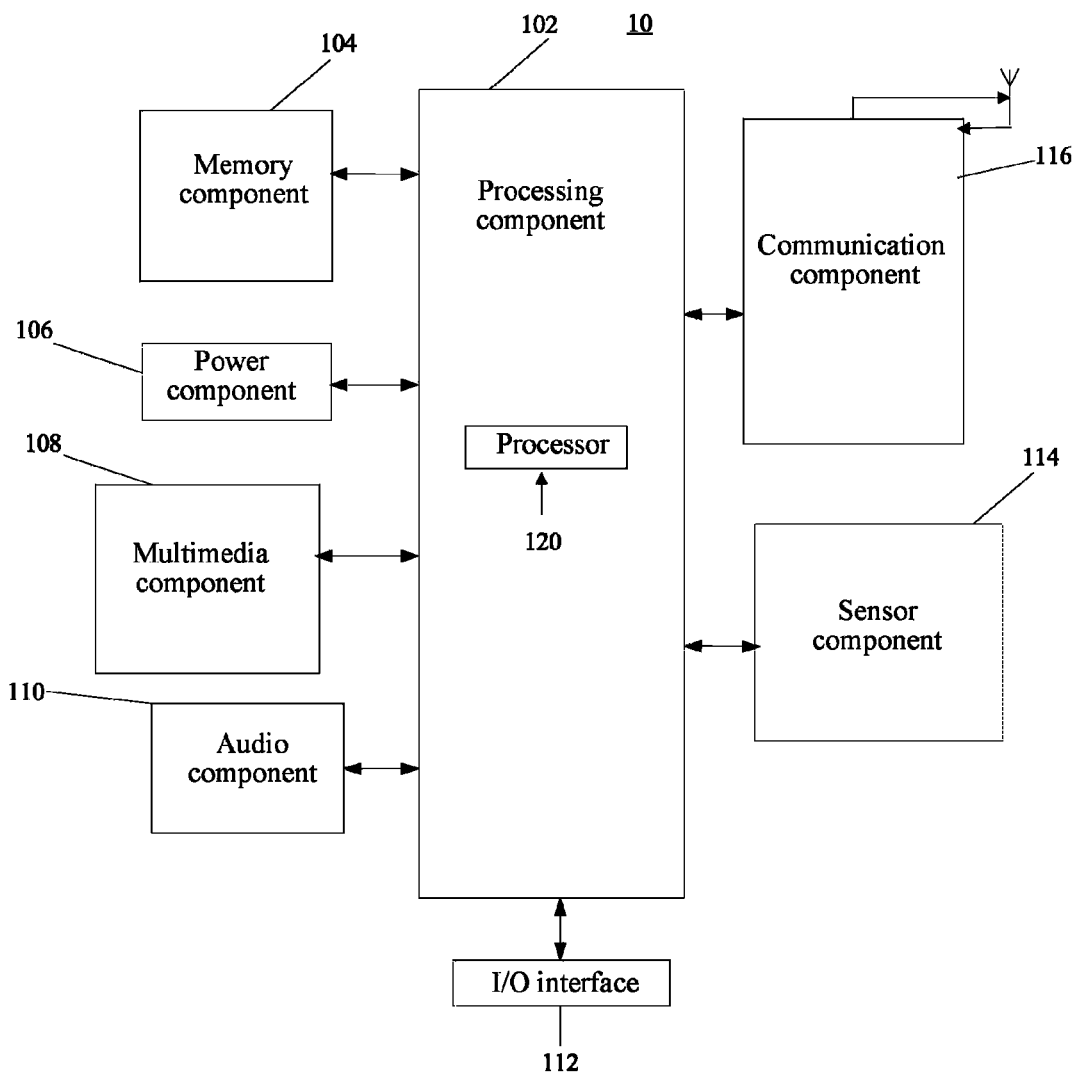
FIG. 11 is a block diagram showing a mobile terminal 10 according to embodiments of the present disclosure.

FIG. 11 is a block diagram showing a mobile terminal 10 according to embodiments of the present disclosure. The mobile terminal 10 includes a mobile phone, a PAD, a notebook computer and the like.

As shown in FIG. 11, the mobile terminal 10 may include one or more of the following components: a processing component 102, a memory component 104, power component 106, a multimedia component 108, an audio component 110, an input/output (I/O) interface 112, a sensor component 114, and a communication component 116.

The processing component 102 typically controls overall operations of the mobile terminal 10, such as the operations associated with display, telephone calls, data communications, and camera operations. The processing component 102 may include one or more processors to execute instructions to perform all or part of the steps in the above described methods.

The memory 104 is configured to store various types of data to support the operation of the mobile terminal 10. Examples of such data may include instructions for any applications or methods operated on the mobile terminal 10, contact data, phonebook data, messages, pictures, audio, video, etc. The memory 104 may include a static random access memory (SRAM), an electrically erasable programmable read-only memory (EEPROM), an erasable programmable read-only memory (EPROM), a read-only memory (ROM), a magnetic memory, a flash memory, a magnetic disk, optical disk and the like.

The power component 106 provides power to various components of the mobile terminal 10. The power component 106 may include a power management system, one or more power sources, and any other components associated with the generation, management, and distribution of power.

The multimedia component 108 includes a screen. In some embodiments, the screen may include a liquid crystal display and a touch panel. The touch panel includes one or more touch sensors to sense gestures such as touches and swipes on the touch panel. In some embodiments, the multimedia component 108 may include a front camera and/or a rear camera.

The audio component 110 is configured to output and/or input audio signals. For example, the audio component 110 may include a microphone configured to receive an external audio signal. The received audio signal may be further stored in the memory component 104 or transmitted via the communication component 116. The audio component 110 may also include a speaker to output audio signals.

The I/O interface 112 provides an interface between the mobile terminal and peripheral devices, such as a keyboard, a button and the like.

The sensor component 114 may include one or more sensors to provide status information on the mobile terminal 10. For example, the sensor component 114 may include a motion sensor, configured to collect motion information on the mobile terminal. For example, the sensor component 114 may include an accelerometer, configured to collect acceleration information on the mobile terminal 10; the sensor component 114 may also include a gyroscope, configured to collect an angular velocity information on the mobile terminal 10; or, the sensor component 114 may also include an altimeter, configured to collect height information on the mobile terminal 10. The sensor component 114 may also include a proximity sensor, configured to collect distance information between the mobile terminal 10 and a surrounding object. The sensor component 114 may also include an optical sensor, a temperature sensor, a magnetic sensor, a pressure sensor and the like.

The communication component 116 is configured to facilitate communication, wired or wirelessly, between the mobile terminal 10 and other devices. The mobile terminal 10 can communicate based on a communication standard, such as WiFi, 2G, 3G, or 4G, etc. In some embodiments, the communication component 116 may include a near field communication (NFC) module to facilitate short-range communications based on a radio frequency identification (RFID) technology, an infrared data association (IrDA) technology, an ultra-wideband (UWB) technology, a Bluetooth (BT) technology, and the like In some embodiments, the mobile terminal 10 may be implemented with application specific integrated circuits (ASICs), digital signal processors (DSPs), digital signal processing devices (DSPDs), programmable logic devices (PLDs), field programmable gate arrays (FPGAs), controllers and the like, for performing the above described methods.

In some embodiments, instructions in the memory component 104 are executed by the processing component 120 of the mobile terminal 10, to cause the mobile terminal 10 to execute instructions corresponding to the steps of the above-described methods. For example, the hand free mode is enabled; in case where the hand free mode has been enabled and the receiver mode is not enabled, it is determined through the motion sensor whether or not the mobile terminal 10 is picked up; the receiver mode is enabled and the hand free mode is kept being enabled based on a determination that the mobile terminal 10 is picked up; in case where both of the receiver mode and the hand free mode are enabled, it is determined through the proximity sensor whether or not the mobile terminal 10 is covered; and the hand free mode is disabled and the receiver mode is kept being enabled based on a determination that the mobile terminal is covered.

In some embodiments, there is also provided a non-volatile computer readable storage medium containing instructions, such as included in the above memory 104 of the mobile terminal 10, executable by the processor 120, for performing the above-described methods. For example, the non-volatile computer readable storage medium may be a ROM, a RAM, a CD-ROM, a magnetic tape, a floppy disc, an optical data storage device, and the like.

Figure 12:
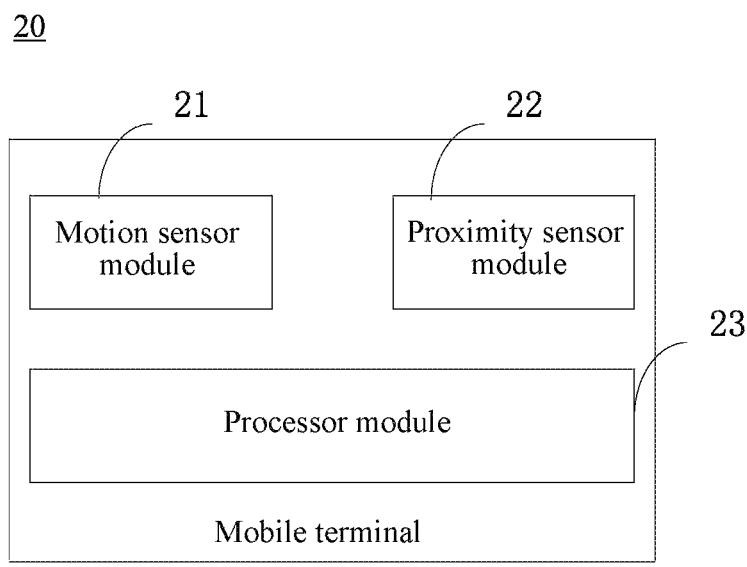
FIG. 12 is a block diagram showing a mobile terminal 20 according to embodiments of the present disclosure.

In some embodiments, there is provided a mobile terminal. As shown in FIG. 12. A mobile terminal 20 may include a motion sensor module 21, a proximity sensor module 22 and a processor module 23. The processor module 23 is configured to determine whether or not the mobile terminal 20 is picked up through the motion sensor module 21, in case where a hand free mode has been enabled and a receiver mode is not enabled. The processor module 23 is configured to enable the receiver mode and to keep the hand free mode being enabled, based on a determination that the mobile terminal 20 is picked up. The processor module 23 is configured to determine whether or not the mobile terminal 20 is covered through the proximity sensor module 22 in a state where both of the receiver mode and the hand free mode are enabled. The processor module 23 is also configured to disable the hand free mode and to keep the receiver mode being enabled, based on a determination that the mobile terminal 20 is covered.

For example, the motion sensor module 21 may include at least one of a gyroscope, an accelerometer or an altimeter. For example, in a state where the hand free mode has been enabled and the receiver mode is not enabled, that is, audio signals are output from the mobile terminal 20 through the speaker used in the hand free mode, the processor module 23 is configured to determine whether or not the mobile terminal 20 is picked up by an angular velocity signal of the mobile terminal received from the gyroscope, and/or by an acceleration signal of the mobile terminal received from the accelerometer, and/or by a height signal of the mobile terminal received from the altimeter. Specific implementations for determining whether the mobile terminal is picked up are not limited herein. In some embodiments, specific implementations for determining whether or not the mobile terminal is picked up may be referred to manners described in EP1748631, the entire contents of which are incorporated herein by reference.

In some embodiments, for example, if it is determined by the mobile terminal 20 through the motion sensor module 21 (such as the gyroscope, the accelerometer and/or the altimeter, and the like) that the mobile terminal 20 is picked up, the processor module 23 is configured to enable the receiver mode and to keep the hand free mode being enabled based on this determination. In other words, the receiver mode is enabled so that both of the receiver mode and the hand free mode are in an enabled state, that is, audio signals are simultaneously output from the mobile terminal 20 through the speakers respectively used in the receiver mode and the hand free mode. In some embodiments, determination conditions for enabling the receiver mode and keeping the hand free mode being enabled are not limited thereto. That is, the processor module 23 may enable the receiver mode and keeps the hand free mode being enabled based on a combination of other appropriate determination(s) and the determination that the mobile terminal is picked up. Alternatively, the processor module 23 may be configured to enable the receiver mode and to keep the hand free mode being enabled only based on a determination that the mobile terminal is picked up.

In some embodiments, for example, the processor module 23 may be configured to determine whether or not the mobile terminal 20 is covered (by a face of a user, for example) through the proximity sensor module 22 in a state where both of the receiver mode and the hand free mode are enabled. In some embodiments, for example, a distance between the mobile terminal 20 and the face of the user is determined through the proximity sensor module 22. For example, if the distance is greater than a predetermined distance threshold, it is determined that the mobile terminal 20 is not covered; and if the distance equals to and/or is less than the predetermined distance threshold, it is determined that the mobile terminal 20 is covered. Specific implementations for determining whether or not the mobile terminal is covered are not limited herein. In some embodiments, specific implementations for determining whether or not the mobile terminal is covered may be referred to the method(s) described in CN102801869A, the entire contents of which are incorporated herein by reference.

In some embodiments, for example, in case where it is determined that the mobile terminal 20 is covered, it is considered as that the distance between the mobile terminal 20 and the face of the user is small enough, and voice signals from the mobile terminal 20 may be heard clearly by the user through the receiver mode at this time. Therefore, the processor module 23 is configured to disable the hand free mode and to keep the receiver mode being enabled. That is, audio signals are output from the mobile terminal 20 only through the speaker used in the receiver mode.

In some embodiments, determination conditions for disabling the hand free mode and keeping the receiver mode being enabled are not limited thereto. That is, the processor module 23 may disable the hand free mode and keep the receiver mode being enabled based on a combination of other appropriate determination(s) and the determination that the mobile terminal is covered. Alternatively, the processor module 23 may be configured to disable the hand free mode and to keep the receiver mode being enabled only based on the determination that the mobile terminal is covered.

Through the above embodiments, during the process that the mobile terminal 20 is picked up, the receiver mode is enabled and the hand free mode is kept being enabled, such that both of the modes of the mobile terminal 20 are enabled. During the process the mobile terminal 20 is picked up, audio signals are simultaneously output from the speakers respectively used in the two modes; and the hand free mode is enabled until the mobile terminal 20 is covered (which may be understood as the mobile terminal 20 is close to an ear of the user). Therefore, during the whole process from the mobile terminal 20 is picked up to the mobile terminal becomes close to the ear of the user, the speaker used in at least one mode is active, so that the user may clearly hear the voice output from the mobile terminal 20 during the whole process, and the technical problem in the related art (i.e., the output voice tends to be intermittent and even some information may be missed by the user when a switch is made between the hand free mode and the receiver mode) is overcome.

Alternatively, if it is determined through the motion sensor module 21 that the mobile terminal 20 is not picked up in case where the hand free mode has been enabled and the receiver mode is not enabled, the processor module 23 is configured to keep the hand free mode being enabled and to determine whether or not the mobile terminal 20 is picked up through the motion sensor module 21.

Alternatively, if it is determined through the proximity sensor module 22 that the mobile terminal is not covered in a state where both of the receiver mode and the hand free mode are enabled, the processor module 23 is configure to keep both of the receiver mode and the hand free mode being enabled, and to determine whether or not the mobile terminal 20 is covered through the proximity sensor module 22.

Alternatively, the processor module 23 may be configured to determine whether or not the mobile terminal 20 is picked up through the motion sensor module 21, and to determine whether the mobile terminal 20 is not covered through the proximity sensor module 22 in case where hand free mode has been enabled and the receiver mode is not enabled. Based on a determination that the mobile terminal 20 is picked up and not covered, the receiver mode is enabled and the hand free mode is kept being enabled.

Alternatively, the processor module 23 is configured to determine whether the mobile terminal 20 is picked up through the motion sensor module 21 in case where the hand free mode has been enabled and the receiver mode is not enabled. The processor module 23 is configured to determine whether the mobile terminal 20 is not covered through the proximity sensor module 22, if it is determined that the mobile terminal 20 is picked up. The processor module 23 is also configured to enable the receiver mode and to keep the hand free mode being enabled, if it is determined that the mobile terminal 20 is picked up and not covered.

Alternatively, the processor module 23 is configured to continue to determine whether the mobile terminal 20 is not covered through the proximity sensor module 22, if it is determined that the mobile terminal 20 is picked up and not covered in case where the hand free mode has been enabled and the receiver mode is not enabled.

Alternatively, the processor module 23 is configured to determine again whether or not the mobile terminal 20 is picked up through the motion sensor module 21, if it is determined that the mobile terminal 20 is picked up and not covered in case where the hand free mode has been enabled and the receiver mode is not enabled; and to determine whether the mobile terminal 20 is not covered through the proximity sensor module 22 in case where it is determined that the mobile terminal 20 is picked up.

Alternatively, the processor module 23 is configured to determine whether the mobile terminal 20 is not covered through the proximity sensor module 22 in case where the hand free mode is has been enabled and the receiver mode is not enabled. The processor module 23 is configured to determine whether or not the mobile terminal 20 is picked up through the motion sensor module 21, if it is determined that the mobile terminal 20 is not covered. The processor module 23 is also configured to enable the receiver mode and to keep the hand free mode being enabled if it is determined that the mobile terminal 20 is not covered and is picked up.

Alternatively, the processor module 23 is configured to continue to determine whether or not the mobile terminal 20 is picked up if it is determined that the mobile terminal 20 is not covered and not picked up in case where the hand free mode has been enabled and the receiver mode is not enabled.

Alternatively, the processor module 23 is configured to determine again whether the mobile terminal 20 is not covered through the proximity sensor module 22, if it is determined that the mobile terminal 20 is not covered and not picked up in case where the hand free mode has been enabled and the receiver mode is not enabled. The processor module 23 is also configured to determine whether or not the mobile terminal 20 is picked up through the motion sensor module 21, if it is determined that the mobile terminal 20 is not covered.

Alternatively, the processor module 23 may be configured to adjust volume of the speaker used in the hand free mode through the motion sensor module 21 in case where both of the receiver mode and the hand free mode are enabled.

For example, in case where both of the receiver mode and the hand free mode are enabled, the processor module 23 may be configured to detect an angular velocity of the mobile terminal through the gyroscope, and to compare the detected angular velocity with a predetermined angular velocity threshold, and then to control the volume of the speaker used in the hand free mode according to the comparison. For example, in case where both of the receiver mode and the hand free mode are enabled, the processor module 23 may be configured to detect an acceleration of the mobile terminal through the accelerometer, and to compare the detected acceleration with a predetermined acceleration threshold, and then to control the volume of the speaker used in the hand free mode according to the comparison. For example, in case where both of the receiver mode and the hand free mode are enabled, the processor module 23 may be configured to detect a height of the mobile terminal through the altimeter, and to compare the detected height with a predetermined height threshold, and then to control the volume of the speaker used in the hand free mode according to the comparison. For example, in case where it is determined that the mobile terminal is getting close to the user according to the comparison, the processor module 23 is configured to decrease the volume of the speaker used in the hand free mode; and in case where it is determined that the mobile terminal is getting far away from the user according to the comparison, the processor module 23 is configured to increase the volume of the speaker used in the hand free mode. In some embodiments, for example, a method disclosed in CN102655541 may be utilized to adjust the volume of the speaker used in the hand free mode.

Alternatively, in case where both of the receiver mode and the hand free mode are enabled, the processor module 23 may be configured to detect a distance between the mobile terminal and a surrounding object (the face of the user, for example) through the proximity sensor module 22, and to compare the detected distance with a predetermined distance threshold, and then to control the volume of the speaker used in the hand free mode according to the comparison. For example, in case where it is determined that the mobile terminal is getting close to the user according to the comparison, the processor module 23 is configured to decrease the volume of the speaker used in the hand free mode; and in case where it is determined that the mobile terminal is getting far away from the user according to the comparison, the processor module 23 is configured to increase the volume of the speaker used in the hand free mode.

Alternatively, in case where both of the receiver mode and the hand free mode are enabled, power and/or noise reduction of a microphone used in the receiver mode of the mobile terminal 20 may be adjusted through the motion sensor 21.

For example, in case where both of the receiver mode and the hand free mode are enabled, the processor module 23 may configured to detect an angular velocity of the mobile terminal through the gyroscope, and to compare the detected angular velocity a predetermined angular velocity threshold, and then to control the power and/or noise reduction of the microphone used in the receiver mode according to the comparison. For example, in case where both of the receiver mode and the hand free mode are enabled, the processor module 23 may be configured to detect an acceleration of the mobile terminal through the accelerometer, and to compare the detected acceleration with a predetermined acceleration threshold, and then to control the power and/or noise reduction of the microphone used in the receiver mode according to the comparison. For example, in case where both of the receiver mode and the hand free mode are enabled, the processor module 23 may be configured to detect a height of the mobile terminal through the altimeter, and to compare the detected height with a predetermined height threshold, and then to control the power and/or noise reduction of the microphone used in the receiver mode according to the comparison. For example, in case where it is determined that the mobile terminal is getting close to the user according to the comparison, the processor module 23 is configured to decrease the power of the microphone used in the receiver mode is decreased and/or properly decrease a noise reduction level of the speaker used in the hand free mode; and in case where it is determined that the mobile terminal is getting far away from the user according to the comparison, the processor module 23 is configured to increase the power of the microphone used in the receiver mode is increased and/or properly increase a noise reduction level of the speaker used in the hand free mode.

Alternatively, in case where both of the receiver mode and the hand free mode are enabled, the processor module 23 of the mobile terminal 20 may also be configured to detect a distance between the mobile terminal and a surrounding object (the face of the user, for example) through the proximity sensor module 22, and to compare the detected distance with a predetermined distance threshold, and then by reto control the power and/or noise reduction of the speaker used in the hand free mode according to the comparison. For example, in case where it is determined that the mobile terminal is getting close to the user according to the comparison, the processor module 23 is configured to decrease the power of the microphone used in the receiver mode and/or to properly decrease a noise reduction level of the speaker used in the hand free mode; and in case where it is determined that the mobile terminal is getting far away from the user according to the comparison, the processor module 23 is configured to increase the power of the microphone used in the receiver mode and/or to properly increase a noise reduction level of the speaker used in the hand free mode.

Alternatively, the methods for controlling the speakers for the hand free mode and the receiver mode in the mobile terminal described above are applicable to microphones. Alternatively, determination conditions for turning on and off the microphones may be the same with those for the speakers in a same mobile terminal. Alternatively, determination conditions for turning on and off the microphones may be different from those for the speakers in a same mobile terminal.

Although the present application has been described in detail through the above exemplary embodiments, the scope of the present application is not limited thereto. Various modifications and alterations may be made to the present application by those skilled in the art, without departing from the scope and concept of the present application.

What is claimed is:

1. A method for controlling answer modes of a mobile terminal, wherein the mobile terminal comprises a motion sensor and a proximity sensor, the method comprises:
    enabling a hand free mode;
    determining through the motion sensor whether or not the mobile terminal is picked up in case where the hand free mode has been enabled and a handset mode is not enabled;
    enabling the handset mode and keeping the hand free mode being enabled based on a determination that the mobile terminal is picked up;
    determining through the proximity sensor whether or not the mobile terminal is covered in case where both of the handset mode and the hand free mode are enabled; and
    disabling the hand free mode and keeping the handset mode being enabled based on a determination that the mobile terminal is covered.

2. The method according to claim 1 further comprising:
    determining through the proximity sensor whether the mobile terminal is not covered in case where the hand free mode has been enabled and the handset mode is not enabled; and
    enabling the handset mode and keeping the hand free mode being enabled based on a determination that the mobile terminal is not covered.

3. The method according to claim 1 further comprising:
    adjusting volume of a speaker used in the hand free mode through the motion sensor in case where both of the handset mode and the hand free mode are enabled.

4. The method according to claim 1 further comprising:
    adjusting power and/or noise reduction of a microphone used in the handset mode through the motion sensor in case where both of the handset mode and the hand free mode are enabled.

5. The method according to claim 1, wherein the motion sensor comprises at least one of a gyroscope, an accelerometer or an altimeter.

6. A mobile terminal comprising:
    a motion sensor;
    a proximity sensor;
    a memory configured to store instructions;
    a processor configured to execute the instructions to cause the mobile terminal to perform:
        enabling a hand free mode;
        determining through the motion sensor whether or not the mobile terminal is picked up in case where the hand free mode has been enabled and a handset mode is not enabled;
        enabling the handset mode and keeping the hand free mode being enabled based on a determination that the mobile terminal is picked up;
        determining through the proximity sensor whether or not the mobile terminal is covered in case where both of the handset mode and the hand free mode are enabled; and
        disabling the hand free mode and keeping the handset mode being enabled based on a determination that the mobile terminal is covered.

7. The mobile terminal according to claim 6, wherein the processor further executes the instructions to cause the mobile terminal to perform:
    determining through the proximity sensor whether the mobile terminal is not covered in case where the hand free mode has been enabled and the handset mode is not enabled; and
    enabling the handset mode and keeping the hand free mode being enabled based on a determination that the mobile terminal is not covered.

8. The mobile terminal according to claim 6, wherein the processor further executes the instructions to cause the mobile terminal to perform:
    adjusting volume of a speaker used in the hand free mode through the motion sensor in case where both of the handset mode and the hand free mode are enabled.

9. The mobile terminal according to claim 6, wherein the processor further executes the instructions to cause the mobile terminal to perform:
    adjusting power and/or noise reduction of a microphone used in the handset mode through the motion sensor in case where both of the handset mode and the hand free mode are enabled.

10. The mobile terminal according to claim 6, wherein the motion sensor comprises at least one of a gyroscope, an accelerometer or an altimeter.

11. A non-volatile computer readable storage medium storing programs for controlling answer modes of a mobile terminal thereon, wherein the mobile terminal comprises a motion sensor and a proximity sensor;
    wherein the programs are executed to cause the mobile terminal to perform:
        enabling a hand free mode;
        determining through the motion sensor whether or not the mobile terminal is picked up in case where the hand free mode has been enabled and a handset mode is not enabled;
        enabling the handset mode and keeping the hand free mode being enabled based on a determination that the mobile terminal is picked up;
        determining through the proximity sensor whether or not the mobile terminal is covered in case where both of the handset mode and the hand free mode are enabled; and
        disabling the hand free mode and keeping the handset mode being enabled based on a determination that the mobile terminal is covered.

12. The storage medium according to claim 11, wherein the programs are executed to cause the mobile terminal to perform:
    determining through the proximity sensor whether the mobile terminal is not covered in case where the hand free mode has been enabled and the handset mode is not enabled; and
    enabling the handset mode and keeping the hand free mode being enabled based on a determination that the mobile terminal is not covered.

13. The storage medium according to claim 11, wherein the programs are executed to cause the mobile terminal to perform:
   adjusting volume of a speaker used in the hand free mode through the motion sensor in case where both of the handset mode and the hand free mode are enabled.

14. The storage medium according to claim 11, wherein the programs are executed to cause the mobile terminal to perform:
   adjusting power and/or noise reduction of a microphone used in the handset mode through the motion sensor in case where both of the handset mode and the hand free mode are enabled.

15. The storage medium according to claim 11, wherein the motion sensor comprises at least one of a gyroscope, an accelerometer or an altimeter.

* * * * *